Patented Jan. 5, 1932

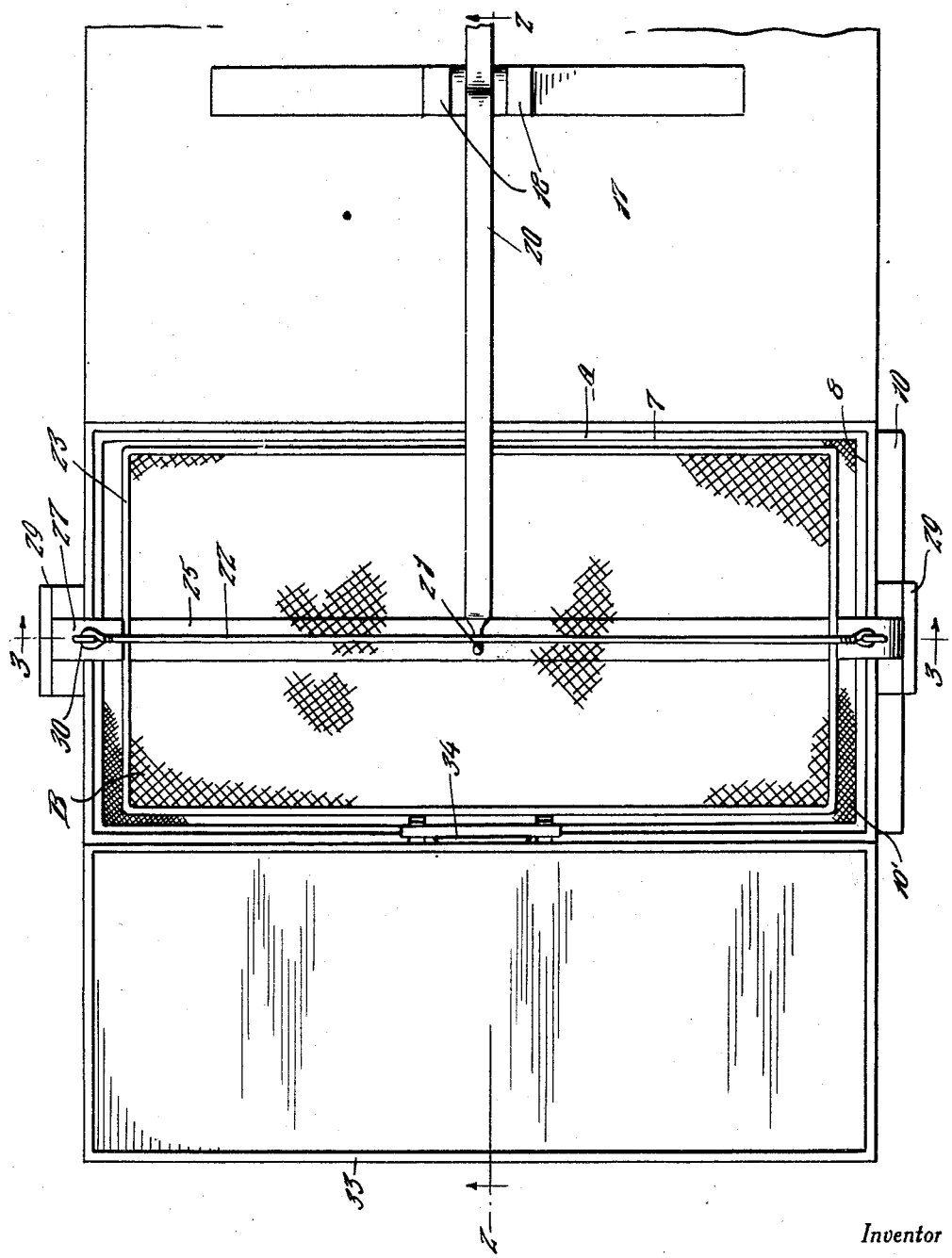

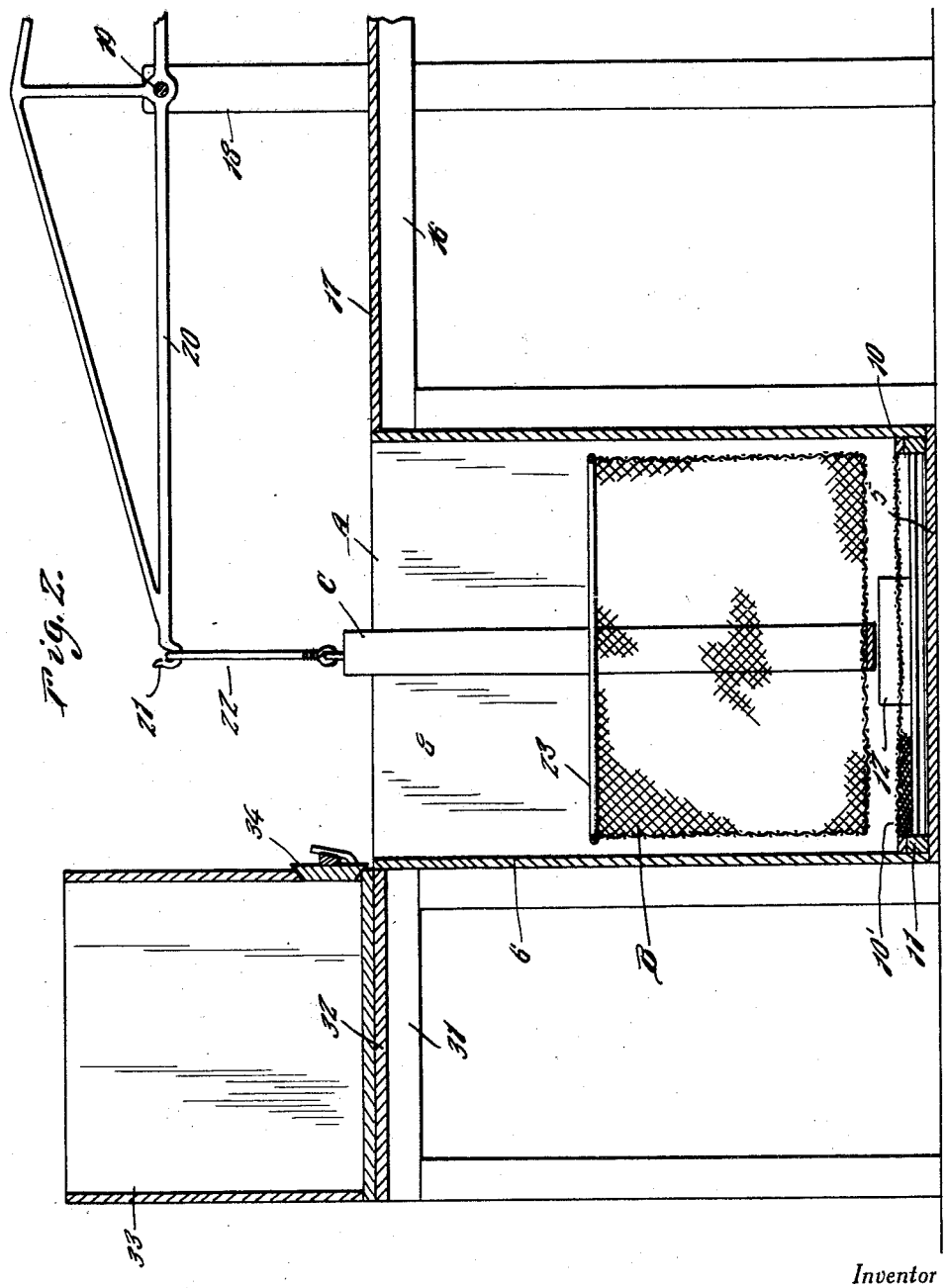

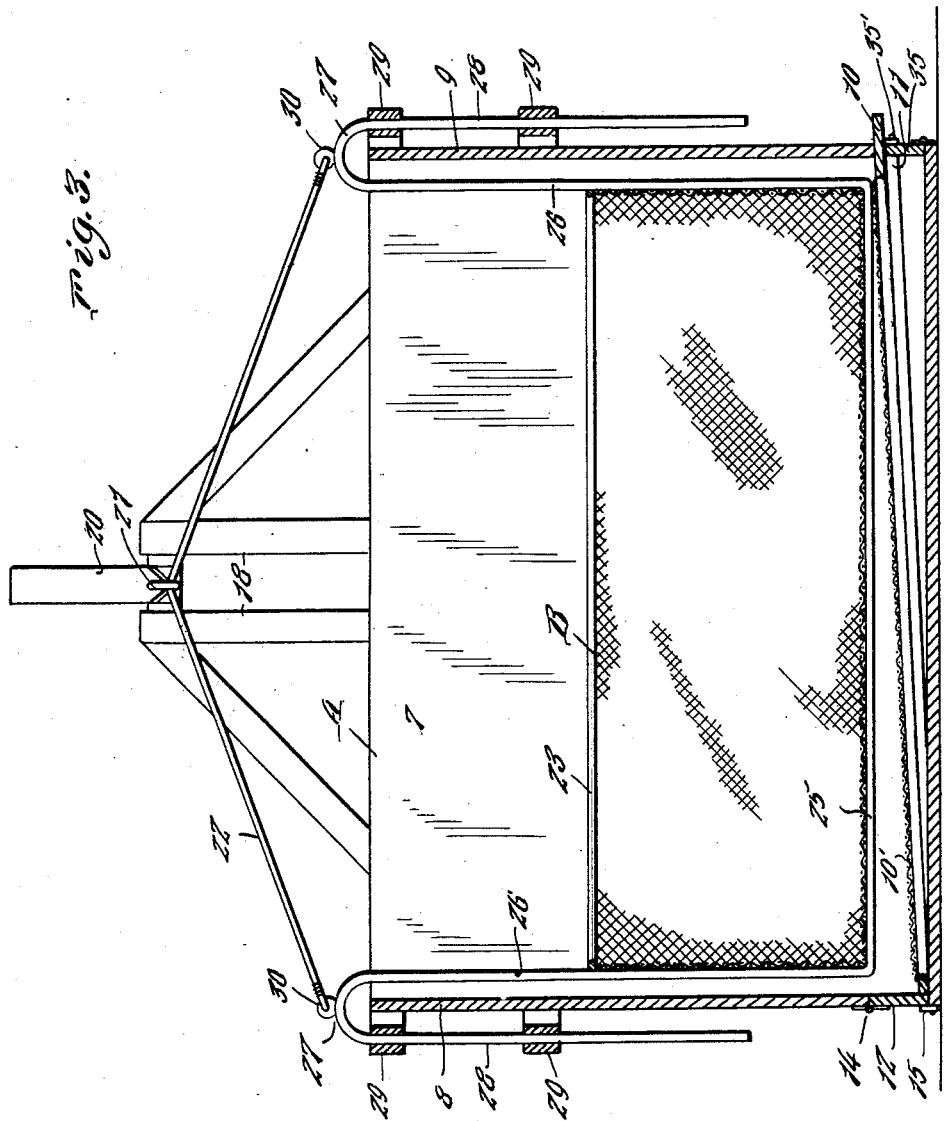

1,840,173

UNITED STATES PATENT OFFICE

WILLIAM J. RAY, OF LOUISVILLE, KENTUCKY

SLACK BOX

Application filed March 6, 1929. Serial No. 344,904.

The present invention relates to a lime slacker and the object of the invention resides in the provision of a box with a movable wire basket on the inside of the box to hold the lime so that said basket may be moved up and down through water and is of such size as to leave a space entirely around the basket that is between the outside of the basket and the inside of the box so that water may pass all around the basket and efficiently wash out the lime as it slacks and prevent the lime from burning during the process of slacking.

The apparatus for carrying out this object is exceedingly simple in its construction, strong and durable, inexpensive to manufacture, compact and convenient in its arrangement of parts, easy to manipulate, and thoroughly reliable and effective in operation.

With the above and numerous other objects in view as will appear as the description proceeds, the invention resides in certain novel features of construction, and in the combination and arrangement of parts as will be hereinafter more fully described and claimed.

In the drawings:

Figure 1 is a top plan view of the apparatus embodying the features of my invention, Figure 2 is a vertical section therethrough taken substantially on the line 2—2 of Figure 1, and Figure 3 is a vertical section taken substantially on the line 3—3 of Figure 1.

Referring to the drawings in detail it will be seen that the letter A denotes a box of rectangular formation including a bottom 5, side walls 6 and 7, and end walls 8 and 9. Within the box, and mounted on cleats 11 resting on the bottom 5 along the sides 6 and 7 is a rectangular frame member 10 for supporting a wire screen 10', and this frame and screen incline toward a hinged gate 12 provided at the bottom of the end wall 8. This gate 12 is hingedly mounted as at 14 and suitable means 15 is utilized for holding the gate.

As shown to advantage in Figure 3 of the drawings, the lower edge of the end wall 9 is spaced from the bottom 5, to permit one end of the frame 10 to project outwardly of the box, while a door 35 is hingedly connected to the bottom 5 to swing upwardly for disposition within the intervening space. Suitable fastening means 35' is carried by the door for engagement with the projecting end of the frame 10.

Suitable supporting structure 16 is mounted adjacent the side 7 and supports a platform 17. Portions of the supporting structure 16 rise above the platform 17 forming standard extensions 18 on which is fulcrumed as at 19 a rocked structure 20 one end of which is provided with a hook 21 above the approximate center of the box A and a link 22 is engaged with the hook.

This link 22 is of an inverted V-shaped formation. A rectangular basket B has its bottom, sides and ends formed of mesh material and is provided with a strengthening rod 23 about the upper edge thereof. This basket B is of such a dimension as to fit in the box A leaving a space therebetween and the walls of the box A.

A cradle C is provided for the basket and comprises a bottom bar 25 extending longitudinally under the bottom of the basket and merging into upstanding arms 26. The upper extremities of the arms 26 merge into outwardly curved bight portions 27 which in turn merge into downwardly disposed guide legs 28 slidable through guide members 29 mounted on the ends 8 and 9.

Eyes 30 are formed to rise from the center of the bight portion 27 and are engaged by the extremities of the link or bail 22. A supporting structure 31 is disposed adjacent the side 6 and has a platform 32 thereon and upon which rests a water tank or container 33 having a door 34 in the bottom portion thereof so that this door may be open to pour water into the box A.

The rocker 20 may be actuated manually or by any suitable means for raising and lowering the basket. In actual practice this basket will be moved up and down through water contained in the box A allowing the water to pass around the basket on all sides which action will wash out the lime as it slacks and prevents the lime from burning during the process of slackening. It has been found that lime slacked in this manner is far superior to that slacked in the ordinary common manner now in use.

It is thought that the construction, utility and advantages of this invention will now be quite apparent to those skilled in this art without a more detailed description thereof. The present embodiment of the invention has been disclosed in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. In an apparatus of the class described, a box, a mesh basket mounted in the box, a cradle for said basket, said cradle including a horizontal longitudinal bar under the basket merging into upstanding legs which in turn merge into outwardly directed curved bights extending over the ends of the box, said bights merging into depending guide arms, and guide members on the ends of the box through which said guide arms are slidable, and means for raising and lowering the cradle.

2. In an apparatus of the class described, a box, a mesh basket mounted in the box, a cradle for said basket, said cradle including a horizontal longitudinal bar under the basket merging into upstanding legs which in turn merge into outwardly directed curved bights extending over the ends of the box, said bights merging into depending guide arms, and guide members on the ends of the box through which said guide arms are slidable, a bail, means engaging the ends of the bail with the said bights, a rocker, means for pivotally mounting the rocker, and said bail being engaged with one end of said rocker.

3. In an apparatus of the class described, a box, a mesh basket mounted in the box, a cradle for said basket, said cradle including a horizontal longitudinal bar under the basket merging into upstanding legs which in turn merge into outwardly directed curved bights extending over the ends of the box, said bights merging into depending guide arms, and guide members on the ends of the box through which said guide arms are slidable, a bail, means engaging the ends of the bail with the said bights, a rocker, means for pivotally mounting the rocker, said bail being engaged with one end of said rocker, a water container, means for supporting the water container to one side of the box, said container having an outlet to pour water into the box, and a closure for said outlet.

4. In an apparatus of the class described, a box, a mesh basket mounted in the box, a cradle for said basket, said cradle including a horizontal longitudinal bar under the basket merging into upstanding legs which in turn merge into outwardly directed curved bights extending over the ends of the box, said bights merging into depending guide arms, and guide members on the ends of the box through which said guide arms are slidable, a bail, means engaging the ends of the bail with the said bights, a rocker, means for pivotally mounting the rocker, said bail being engaged with one end of said rocker, a water container, means for supporting the water container to one side of the box, said container having an outlet to pour water into the box, a closure for said outlet, said box including an outlet in one end, and a closure for said outlet of the box.

5. In an apparatus of the class described, a box, a mesh basket mounted in the box, a cradle for said basket, said cradle including a horizontal longitudinal bar under the basket merging into upstanding legs which in turn merge into outwardly directed curved bights extending over the ends of the box, said bights merging into depending guide arms, and guide members on the ends of the box through which said guide arms are slidable, a bail, means engaging the ends of the bail with the said bights, a rocker, means for pivotally mounting the rocker, said bail being engaged with one end of said rocker, a water container, means for supporting the water container to one side of the box, said container having an outlet to pour water into the box, a closure for said outlet, said box including a pair of oppositely disposed outlets, a closure for each outlet of said pair, a screen disposed within the box adjacent the outlets of said pair, and means for mounting the screen to incline toward one of the said outlets of the box.

In testimony whereof I affix my signature.

WILLIAM J. RAY.